United States Patent
Kobayashi et al.

[11] Patent Number: 5,308,593
[45] Date of Patent: May 3, 1994

[54] PREPARATION DEVICE FOR PHOTOGRAPHIC LIQUID TO BE APPLIED

[75] Inventors: Chuzo Kobayashi; Yasunori Ichikawa; Shigeru Yamaguchi, all of Kanagawa, Japan

[73] Assignee: Fuji Photo Film Co., Ltd., Kanagawa, Japan

[21] Appl. No.: 970,984

[22] Filed: Nov. 2, 1992

Related U.S. Application Data

[63] Continuation of Ser. No. 519,337, May 3, 1990, abandoned, which is a continuation of Ser. No. 188,344, May 4, 1988, abandoned.

[30] Foreign Application Priority Data

May 7, 1987 [JP] Japan .................. 62-109689

[51] Int. Cl.$^5$ .................................. B01D 17/00
[52] U.S. Cl. ................................ 422/243; 436/47; 141/100; 141/104; 141/173; 141/169; 430/935; 430/569
[58] Field of Search ............ 422/61, 63, 243; 436/47-48; 141/100-104, 93, 168, 169, 173-174, 176, 179; 430/935, 569

[56] References Cited

U.S. PATENT DOCUMENTS

| Re. 31,108 | 12/1982 | Ginsberg et al. | 422/64 |
| 2,462,019 | 2/1949 | Bowman | 141/104 |
| 3,140,921 | 7/1964 | Barrow | 422/243 |
| 4,333,908 | 6/1982 | Maki et al. | 422/61 |
| 4,583,571 | 4/1986 | Frocke et al. | 141/83 |

FOREIGN PATENT DOCUMENTS 2009607 6/1979 United Kingdom .

OTHER PUBLICATIONS

European Search Report, The Hague, Jan. 23, 1989, Examiner R. E. vanIddekinge Patent Abstracts of Japan, vol. 5, No. 138 (p. 78), Sep. 2, 1981.

Primary Examiner—Lyle A. Alexander
Attorney, Agent, or Firm—Sughrue, Mion, Zinn, Macpeak & Seas

[57] ABSTRACT

The present invention relates to a device for preparing a photographic liquid which is to be applied in the manufacture of a photographic photosensitive material wherein multiple layers of photographic liquids are applied simultaneously. The present invention has at least one chemical measuring station which measures various kinds of chemicals sent from chemical storage tanks and prepares a photographic liquid which is to be applied to a film, supplies the measured chemicals to a pot and a conveys the chemicals in the pot to a hopper from which the chemicals are supplied to a liquid preparation tank.

5 Claims, 2 Drawing Sheets

PREPARATION DEVICE FOR PHOTOGRAPHIC LIQUID TO BE APPLIED

This is a continuation of application Ser. No. 07/519,337 filed May 3, 1990, now abandoned, which in turn is a continuation of application Ser. No. 07/188,344, filed May 4, 1988, now abandoned.

BACKGROUND OF THE INVENTION

The present invention relates to a device for preparing a photographic liquid which is to be applied in the manufacture of a photographic photosensitive material, and particularly relates to a photographic liquid preparation device which is effective in applying multiple layers of photographic liquids at the same time.

A general type of liquid preparation device was disclosed in the Japanese Patent Application (OPI) No. 74715/81 (the term "OPI" as used herein means an "unexamined published application").

In the manufacture of a photographic photosensitive material, multiple layers of different liquids need to be applied on top of one another on a carrier made of a plastic film of triacetyl cellulose, polyethylene terephthalate or the like, or made of laminated paper. For a color-sensitive material, for example, the layers of such applied liquids include photosensitive emulsion layers sensitive to red, blue and green light, respectively, and are of two or three different sensitivities, high, medium and low sensitivities. Also included is an intermediate layer serves as an optical filter, a protective layer which enhances the physical strength of the surface of the material, and so forth. Presently, in current color film ten or more layers are applied in all.

To apply such a large number of liquids, an apparatus which can apply multiple layers simultaneously is used in order to enhance productivity. Usually, multiple liquids are applied at the same time. For that purpose, the plural different liquids need to be simultaneously prepared and supplied to an application process in order to manufacture a photographic photosensitive material. Each of the liquids is produced by adding various kinds of chemicals to a raw emulsion or an emulsified substance as the main constituent of the liquid, mixing them and stirring them. The added chemicals include an acid or alkali for pH adjustment, a viscosity increasing agent for viscosity adjustment, a surface active agent for surface tension adjustment, and so forth. Many of the chemicals are added at different mixture ratios for different liquids.

In a conventional device for preparing a photographic liquid which is to be subsequently applied, a single pipe is laid from each chemical storage tank (m kinds in all) to each liquid preparation tank (n kinds in all) and fitted with a measuring unit, a control unit, a valve and so forth. Therefore, n×m sets of pipes, measuring units, control units, valves and so forth are provided in all in the conventional device.

As a result, the conventional device has problems mentioned below.
(1) Since there are a large number of the pipes, the measuring units, the control units, the valves and so forth, the cost of the equipment is high.
(2) Maintenance of the device requires a large number of steps.
(3) The reliability of the equipment as a whole is low.

SUMMARY OF THE INVENTION

Accordingly, it is an object of the present invention to provide a photographic liquid preparation device which solves the above-mentioned problems.

Another object of the present invention to provide a photographic liquid preparation device in which the cost of equipment and maintenance are reduced and the reliability of the equipment as a whole is enhanced, and which can be easily modified to cope with changes in an applied liquid preparation procedure and is thus, more suitable for applying many different kinds of liquids at the same time.

Figure 1:
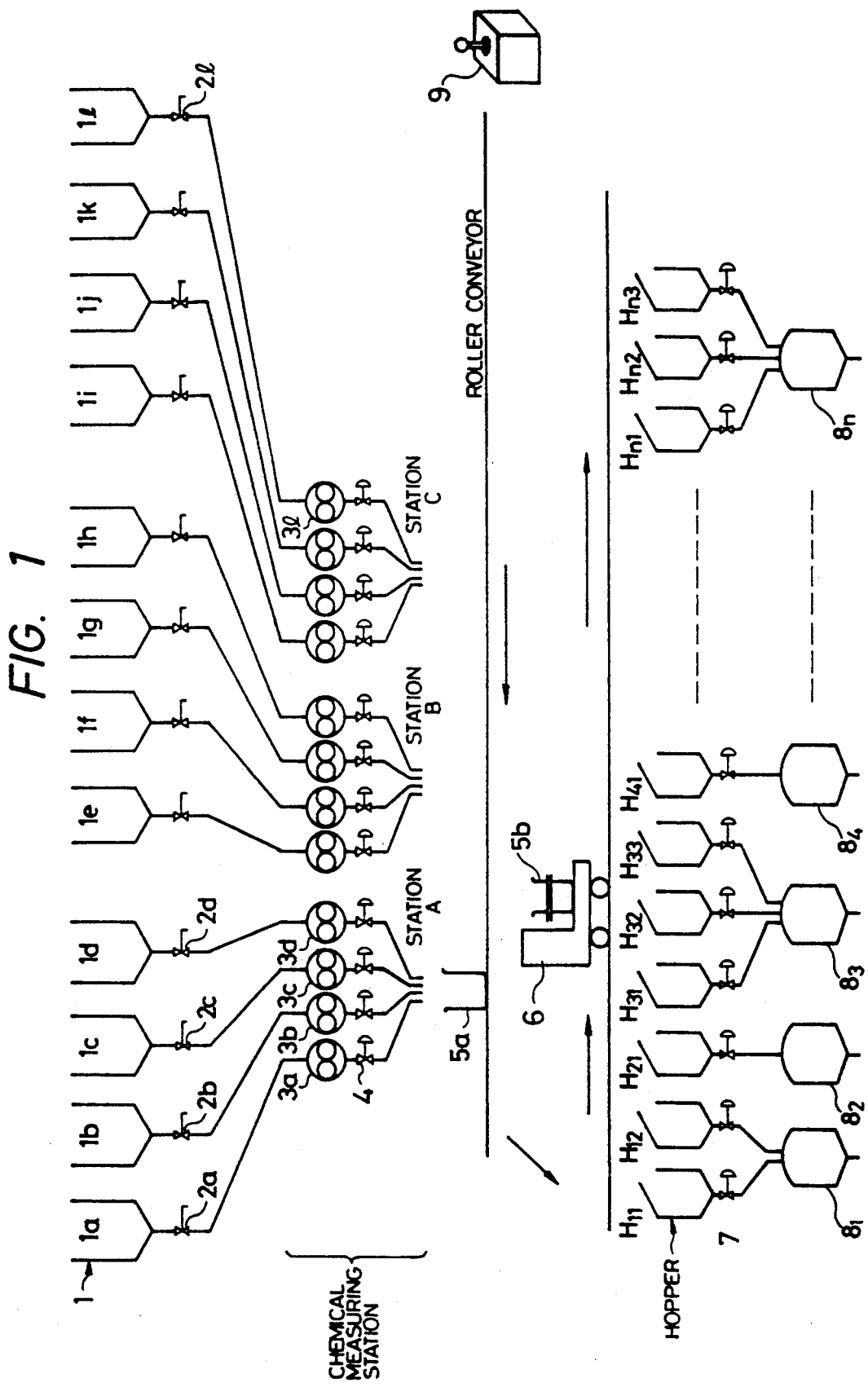
FIG. 1 shows a flow chart of a device for applying photographic liquid after preparation according to an embodiment of the present invention.

Shown in the drawings are chemical storage tanks $1a$, $1b$, ... and $11$, upstream valves $2a$, $2b$, ... and $2$, chemical measuring units (oval gear flow meters) $3a$, $3b$, ... and $31$, control valves $4a$, $4b$, ... and $41$, pots $5a$ and $5b$, a pot conveyor (unmanned moving truck) $6$, hoppers $H_{11}$, $H_{21}$, ... and $H_{n1}$, regulation valves $7$, liquid preparation tanks $8_1$, $8_2$, ... and $8_n$, and a washer $9$.

DESCRIPTION OF THE PREFERRED EMBODIMENTS

The photographic liquid preparation and application device provided in accordance with the present invention has at least one chemical measuring station which measures various kinds of chemicals sent from chemical storage tanks and prepares a photographic liquid which is to be applied, then supplies the measured chemicals to a pot. A conveyor carries the chemicals in the pot to a hopper from which the chemicals are supplied to a liquid preparation tank.

Each of the chemicals necessary to prepare the photosensitive liquid contains water as a solvent or contains an organic solvent such as methanol. Since some chemicals containing organic solvents are peculiar to liquids used in the manufacture of photographic photosensitive material and thus require the precaution of making the equipment non-explosive, the chemicals are sent directly from chemical storage tanks to the liquid preparation tanks through pipes while being measured. For that reason, the chemicals which are handled in the preparation device are usually those which contain aqueous solvents.

The chemical measuring station, which measures the chemicals from the chemical storage tanks and supplies the measured chemicals to the pot, is provided with pipes extending from the chemical storage tanks and has measuring units for measuring the chemicals, valves and control units for the measuring units and the valves. The pot is moved to the chemical measuring station in accordance with a collective liquid preparation program so that the measured chemicals may be put in the pot. A plurality of such pots may be used. The measuring unit is a cumulative measuring unit employing an oval gear flow meter or the like, a volume-type or weight-type measuring unit employing a differential pressure transmitter, a load cell, a level gauge or the like, or another kind of measuring unit.

A means for moving the pot from one chemical measuring station to another to supply other chemicals into the pot or a means for moving pipes for supplying the chemicals into the pot is provided. For example, the means may be a roller conveyor.

The pot is usually a container made of stainless steel and has a capacity convenient to receive the chemicals in as many kinds and large quantities as possible and convey the chemicals to the hopper for the liquid preparation tank.

The hopper receives the chemicals, and is connected to the liquid preparation tank through a pipe. The hopper is provided with a control valve, to add the received chemicals in the liquid preparation tank in accordance with an addition program.

If some of the chemicals to be added in the liquid preparation tank are not allowed to be mixed together because they will create a chemical reaction with each other when being mixed together, they are sent in different pots to different hoppers from which the chemicals are added in the liquid preparation tank. For that reason, each of such liquid preparation tanks may be provided with a plurality of hoppers.

A pot conveyor is provided in the device to convey the pot so that the chemicals put in the pot at the chemical measuring station are supplied to the hopper for the liquid preparation tank. The pot conveyor may be an unmanned moving truck, a rail-run truck conveyor. a crane or the like, and conveys the pot in accordance with a supply program. The pot conveyor performs reciprocative conveyance between the hopper and a pot washer if necessary.

The liquid preparation tank holds a raw emulsion or an emulsified substance, receives the chemicals from the hopper and a chemical addition pipe in an addition sequence, and is provided with a stirrer and a heater to prepare the photographic liquid to be applied.

An embodiment of the present invention is hereafter described with reference to FIG. 1. Twelve kinds of chemicals $1a$, $1b$, ... and $11$ are prepared. These chemicals are necessary to prepare photographic liquids and are supplied from chemical storage tanks to chemical measuring stations through pipes whose number is equal to that of the chemical storage tanks. Each of the pipes is provided with an upstream valve 2, an oval gear flow meter 3 and a control valve 4. The chemicals are divided into a first group containing chemicals $1a$, $1b$, $1c$ and $1d$, a second group containing $1e$, $1f$, $1g$ and $1h$ and a third group containing $1i$, $1j$, $1k$ and $1l$ for the chemical measuring stations A, B and C, respectively, depending on the liquid preparation program, so that the efficacies of the chemicals of each group do not change when they are mixed together. As a result, a plurality of chemicals from some chemical storage tanks can be simultaneously measured and supplied to an identical pot if necessary. The pot 5 is conveyed on a roller conveyor between the chemical measuring stations so that the pot receives the chemicals from the different chemical measuring stations. Since the chemicals need to be supplied to a hopper H by the pot 5 prior to liquid preparation in each chemical preparation tank 8, an adequate number of such pots are used in view of the time which it takes to receive the chemicals at the chemical measuring stations and which it takes to supply the chemicals to the hopper. Each pot is reciprocated between the chemical measuring station and the hopper H for the liquid preparation tank 8 by a pot conveyor 6.

The necessary number of all the hoppers H for each liquid preparation tank 8 is determined according to the sequence by which the chemicals are added at the time of liquid preparation in the tank, and according to whether or not the chemicals are allowed to be mixed together before being added in the tank. Two hoppers are needed for a liquid preparation tank $8_1$. Three hoppers are needed for each of the liquid preparation tanks $8_3$ and $8_n$. One hopper is required for each of the remaining liquid preparation tanks. Each of the hoppers is supplied with the chemicals received by different pots 5 or by a washed pot 5. For each liquid preparation tank 8 provided with one hopper, the chemicals to be added in the tank are simultaneously measured and supplied to the hopper as the chemicals are mixed together.

Each liquid preparation tank 8 may be provided with a pipe fitted with an upstream valve, a measuring unit and a control valve so as to directly add a chemical (which is usually a chemical containing an organic solvent) to the liquid preparation tank from a chemical storage tank not shown in the drawing.

The chemicals put in the hopper or hoppers are added in the liquid preparation tank 8 through a regulation valve 7 in accordance with a preparation program in order to prepare a liquid and properly supply it for simultaneous multilayer application.

After a chemical which is not allowed to be mixed with a following chemical is supplied from the pot 5 to the hopper H, the interior of the pot is washed by a washer 9 so that the following chemical may be supplied to the pot at the chemical measuring station.

According to the present invention there is provided at least one chemical measuring station where chemicals that are sent from chemical storage tanks are measured in order to prepare a photographic liquid that is to be applied, and which supplies the measured chemicals to a pot. Also provided are a pot conveyor for supplying the chemicals in the pot to a hopper from which the chemicals are supplied to a liquid preparation tank and as a result only one pipe system is needed in order to measure some chemicals which are allowed to be jointly handled. For that reason, the number of all such pipe systems, which would conventionally be $r \times n$ (r denotes the number of all chemical storage tanks and n denotes that of all liquid preparation tanks), can be reduced to r (which is 1/n of the number $r \times n$) through the installation of the chemical measuring stations.

Figure 2:
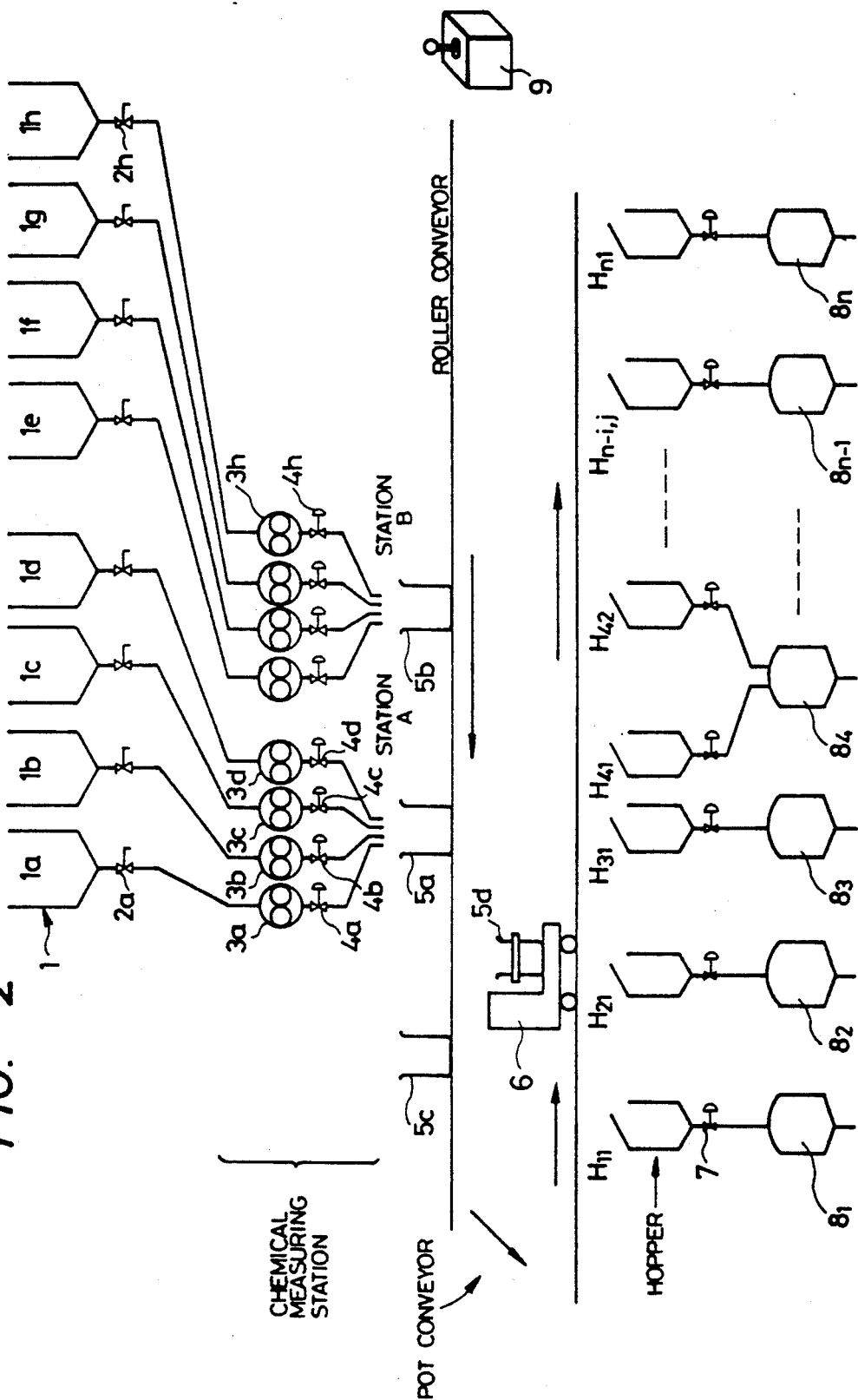
FIG. 2 shows an example of the flow chart of FIG. 1 for a specific example of the present invention.

An example of the present invention as shown in FIG. 1 is hereafter described with reference to FIG. 2. Eight kinds $1a$, $1b$, ... and $1h$ of chemicals containing water as solvents were used to prepare liquids for simultaneous application as four layers. An empty pot was first moved to a chemical measuring station A which measures the chemicals a, b, c and d for the preparation of an emulsion for the first layer. The pot $5a$ was stopped at the station A. The necessary chemicals a, b, c and d were measured by oval gear flow meters $3a$, $3b$, $3c$ and $3d$ so that prescribed quantities of the chemicals were put in the pot as the chemicals were regulated by control valves 4. In the case where the chemicals were simultaneously measured, the time which it took to measure all the chemicals was short. The pot $5a$ was then put on an unmanned moving truck so that the pot was carried to a hopper $H_{11}$ to supply the chemicals. After that, the pot $5a$ was carried to a washer 9 and thereby washed to perform the next chemical reception and supply job. If the chemicals in the pot $5a$ did not affect those which would be put in the pot next, the pot need not be washed by the washer 9.

An empty pot 5b is stopped at a chemical measuring station B so that the measured chemicals e, f, g and h needed to prepare the liquid for the second layer are put in the pot and supplied to a hopper $H_{21}$.

Since the chemicals a, b, e and f are required to prepare the liquid for application as the third layer the pot 5a receives the chemicals a and b at the chemical measuring station A and thereafter receives the other chemicals e and f at the chemical measuring station B so that the pot carried the chemicals a, b, e and f to a hopper $H_{31}$.

Since the chemicals c, d, g and h are needed to prepare the liquid for application as the fourth layer and the chemicals c and d would react with g and h if they were mixed together, such mixing is not performed, and so the pot 5a receives the chemicals c and d at the chemical measuring station A and another pot 5b receives the other chemicals g and h at the chemical measuring station B. The chemicals c and d were supplied from the pot 5a to a hopper $H_{41}$, while the other chemicals g and h were supplied from the other pot 5b to a hopper $H_{42}$.

In each liquid preparation tank 8, the chemicals in the hopper and a chemical containing an organic solvent that was directly sent from a chemical storage tank through a pipe were added to an emulsion or an emulsified substance through a regulation valve 7 or the like, and then underwent stirring, mixing and temperature adjustment, so that the liquid to be applied was prepared.

The present invention is characterized by a photographic liquid preparation and application device having at least one chemical measuring station which measures various kinds of chemicals sent from chemical storage tanks and which are necessary for the prepation of a photographic liquid that is to be applied to a film or the like. The chemical measuring station supplies the measured chemicals to a pot, and a pot conveyor carries the pot to a hopper where the chemicals are supplied to a liquid preparation tank in order to produce the following desirable effects mentioned below.

(1) Only one measuring pipe system is needed for one chemical so that the necessary numbers of measuring units, pipes, control units, valves and so forth can be greatly reduced. As a result, the number of input and output points in the control instrumentation can be reduced to simplify the equipment and operation of the preparation device and greatly decrease the cost of the equipment.

(2) Since the equipment is simplified, the number of maintenance steps therefor is greatly reduced thus lowering the cost of maintenance thereof, and the reliability of the equipment as a whole is significantly enhanced.

(3) When the addition of a different chemical is required due to a change in a preparation procedure or the like, only one measuring pipe system for the additonal different chemical needs to be provided. Thus, the flexibility of the equipment in the event of change in the preparation procedure or the like is heightened which in turn reduces the cost of remodeling of the equipment.

What is claimed is:

1. A device for preparing photographic liquids comprising means for collecting said liquids and means for distributing said liquids, wherein said collecting means comprises:
   a plurality of chemical storage tanks;
   a plurality of flow meters, one of said flow meters being provided for each of said tanks, an inlet of each of said flow meters being connected to an outlet of a respective one of said tanks;
   a plurality of control valves, one of said valves being provided for each of said tanks, an inlet of each of said control valves being connected to an outlet of a respective one of said flow meters;
   a plurality of pipes divided into a plurality of groups, one of said pipes being provided for each of said tanks, an inlet of each of said pipes being connected to an outlet of a respective one of said control valves, outlets of said pipes within each of said groups being gathered at a respective station position;
   at least one pot for receiving chemicals dispensed through said pipes; and
   first conveying means for conveying said pot among said station positions, and wherein said distributing means comprises:
   a plurality of hoppers for receiving said chemicals received in said pot;
   a plurality of chemical preparation tanks to which at least one of said outlets of said hoppers is connected through a valve regulation; and
   a second conveying means for conveying said pot to a position on which one of said hoppers is provided.

2. The device for preparing photographic liquids of claim 1, further comprising a plurality of regulation valves, one of said regulation valves being provided for each of said hoppers, one of said regulation valves being connected between a respective one of said hoppers and one of said preparation tanks.

3. The device for preparing photographic liquids of claim 1, further comprising means for washing said pot.

4. The device for preparing photographic liquids of claim 1, wherein said conveying means comprises a roller conveyor.

5. The device for preparing photographic liquids of claim 1, wherein a plurality of said pots are provided.

* * * * *